United States Patent
Chen

(10) Patent No.: US 10,091,687 B2
(45) Date of Patent: Oct. 2, 2018

(54) METHOD AND DEVICE FOR REPORTING AND RECEIVING BUFFER STATUS

(71) Applicant: ZTE CORPORATION, Shenzhen, Guangdong Province (CN)

(72) Inventor: Zhongming Chen, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/127,658

(22) PCT Filed: May 30, 2014

(86) PCT No.: PCT/CN2014/078934
§ 371 (c)(1),
(2) Date: Oct. 18, 2016

(87) PCT Pub. No.: WO2015/139373
PCT Pub. Date: Sep. 24, 2015

(65) Prior Publication Data
US 2017/0127315 A1    May 4, 2017

(30) Foreign Application Priority Data
Mar. 21, 2014  (CN) .......................... 2014 1 0106691

(51) Int. Cl.
*H04W 28/02* (2009.01)
*H04W 72/12* (2009.01)
(Continued)

(52) U.S. Cl.
CPC ... *H04W 28/0278* (2013.01); *H04W 72/1284* (2013.01); *H04W 76/025* (2013.01); *H04W 76/15* (2018.02); *H04W 88/08* (2013.01)

(58) Field of Classification Search
CPC .......... H04W 28/0278; H04W 76/025; H04W 72/1284; H04W 88/08
See application file for complete search history.

(56) References Cited

U.S. PATENT DOCUMENTS

2011/0292873 A1* 12/2011 Guo ...................... H04L 5/0007
370/328
2011/0310800 A1   12/2011 Lin et al.
(Continued)

FOREIGN PATENT DOCUMENTS

CN    102056332 A    5/2011
CN    102781096 A    11/2012
(Continued)

OTHER PUBLICATIONS

International Search Report and Written Opinion dated Dec. 26, 2014 in PCT Application No. PCT/CN2014/078934.
(Continued)

*Primary Examiner* — Mohammad S Anwar
(74) *Attorney, Agent, or Firm* — Plumsea Law Group, LLC

(57) ABSTRACT

The embodiments of the present document propose a method and apparatus for reporting and receiving a buffer status. The method includes: when a terminal judges that there is a split bearer or receives a notification transmitted by a base station that an additional buffer report is required to be reported, the terminal transmitting a Buffer Status Report (BSR) of the radio bearer to the base station; herein the BSR carries size information about buffer data and size information about additional buffer data of the radio bearer. The embodiments of the present document realize the reporting of a buffer status when there is a split bearer.

14 Claims, 2 Drawing Sheets

(51) Int. Cl.
H04W 76/02 (2009.01)
H04W 76/15 (2018.01)
H04W 88/08 (2009.01)

(56) References Cited

U.S. PATENT DOCUMENTS

2012/0069805 A1* 3/2012 Feuersanger ..... H04W 72/1284
370/329
2015/0098322 A1* 4/2015 Chen ................. H04W 72/0413
370/230

FOREIGN PATENT DOCUMENTS

| CN | 103369509 A | 10/2013 |
| EP | 2858441 A1 | 4/2015 |
| WO | 2015126564 A1 | 8/2015 |

OTHER PUBLICATIONS

European Search Report dated Mar. 2, 2017 for EP Application No. 14886347.5.
Panasonic: "BSR Reporting Options for Dual Connectivity", BSR Reporting in Dual Connectivity, 3rd Generation Partnership Project (3GPP), Mobile Competence Centre; vol. RAN WG2, no. Prague, Czech Republic; Feb. 9, 2014.
Broadcom Corporation: "BSR and LCP with split bearers", BSR and LCP With Split Bearers, 3rd Generation Partnership Project (3GPP), Mobile Competence Centre; vol. RAN WG2, no. Prague Czech Republic; Feb. 9, 2014.
Renesas Mobile Europe: "User plane details related to the SCE user plane architecture selection", User Plane Details Related to SCE User Plane Architecture Selection, 3rd Generation Partnership Project (3GPP), Mobile Competence Centre; vol. RAN WG2, no. Ljubljana, Slovenia; Sep. 27, 2013.
Samsung: "Framework for Buffer Status Reporting in Dual Connectivity", BSR for DC (REVI), 3rd Generation Partnership Project (3GPP), Mobile Competence Centre; vol. RAN WG2, no. Prague, Czech; Feb. 9, 2014.
Office Action dated Nov. 7, 2017 for Japanese Patent Application No. 2016-558348.
Samsung: "Uplink Split and Buffer Status Computation for 3C bearer", 3rd Generation Partnership Project (3GPP), TSG-RAN WG2 Meeting No. 85, Prague, Czech; Feb. 10-14, 2014; R2-140242.
Alcatel-Lucent Shanghai Bell: "BSR and SR for dual connectivity", 3rd Generation Partnership Project (3GPP), TSG RAN WG2 Meeting No. 84, San Francisco, USA; Nov. 11-15, 2013; R2-134381.

* cited by examiner

When a terminal judges that there is a split bearer in a radio bearer or receives a notification transmitted by a base station that an additional buffer report is required to be reported, the terminal transmits a BSR of the radio bearer to the base station, wherein the BSR carries size information about buffer data and size information about additional buffer data of the radio bearer — 100

The terminal receives uplink authorization information transmitted by the base station, and the terminal transmits uplink data according to the uplink authorization information — 101

FIG. 1

A base station receives a BSR of a radio bearer transmitted by a terminal, wherein the BSR carries size information about buffer data and size information about additional buffer data of the radio bearer — 200

The base station determines uplink authorization information according to the BSR and a transmission rule, and transmits the uplink authorization information to the terminal — 201

FIG. 2

METHOD AND DEVICE FOR REPORTING AND RECEIVING BUFFER STATUS

CROSS-REFERENCE TO RELATED APPLICATION(S)

This application is the U.S. National Phase application of PCT application number PCT/CN2014/078934 having a PCT filing date of May 30, 2014, which claims priority of Chinese patent application 201410106691.3 filed on Mar. 21, 2014, the disclosures of which are hereby incorporated by reference.

TECHNICAL FIELD

The present document relates to the field of radio bearer technology, and in particular, to a method and apparatus for reporting and receiving a buffer status.

BACKGROUND OF RELATED ART

In a Long Term Evolution (LTE) system, protocol architecture of a user plane at a terminal side includes the following several protocol layers from bottom to top:

a Physical (PHY) layer, which primarily transmits information to a Media Access Control (MAC) layer or a higher layer through a transmission channel;

the MAC layer, which primarily provides data transmission through a logical channel and is responsible for allocation of radio resources to complete functions such as Hybrid Automatic Repeat Quest (HARD), Scheduling (SCH), priority processing, and Multiplexing (MUX) and de-Multiplexing (DEMUX) etc.;

a Radio Link Control (RLC) layer, which primarily provides segment and retransmission services of user and control data; and a Packet Data Convergence Protocol (PDCP) layer, which primarily completes transfer of user data for Radio Resource Control (RRC) or an upper layer of the user plane.

Under the above protocol architecture, a method for transmitting uplink data by the terminal generally includes:

the terminal establishes Data Radio Bearers (DRBs) with a base station; the base station allocates to the terminal, Logical Channel Groups (LCGs) to which the DRBs belong, herein the LCGs include four subgroups, i.e., 0, 1, 2 and 3 subgroups; when the terminal requires to transmit uplink data and detects that there is no uplink resources or authorization, the terminal transmits a Buffer Status Report (BSR) to the base station, herein the BSR carries an index value corresponding to information about buffer data (i.e., a size of the buffer data) of the radio bearers; herein the size of the buffer data is a sum of sizes of buffer data on the RLC layer and the PDCP layer of the data radio bearers. The base station acquires the size of the buffer data according to the index value in the received BSR, and configures corresponding uplink authorization for the terminal; and after receiving the uplink authorization, the terminal transmits the uplink data. The terminal may report a short BSR or a long BSR or a truncated BSR according to a practical condition.

Due to the short of spectrum resources and the sharp increase of heavy traffic services of mobile users, in order to increase user throughput and enhance mobility performance, a high-frequency point such as 3.5 GHz is used for hotspot coverage, and a node with low power is used. However, the attenuation of signals at the high-frequency point is fast, and a coverage range of a small cell is relatively small and a small cell does not share a site with a related cell. Currently, a lot of companies and operators tend to seek for a new protocol architecture, one of which is Dual Connectivity. Under the Dual Connectivity, the terminal can maintain data connections with more than two service nodes (for example, base stations) at the same time, but the control plane is only connected to one of the service nodes (for example, a base station of a macro cell).

Currently, one of the protocol architectures is to use a manner of split bearer, which is to split a data radio bearer among multiple base stations, i.e., data of one data radio bearer are transmitted through multiple base stations. In this architecture, there is only one PDCP layer of the terminal corresponding to the base station, but various RLC layers correspond to PLC layers on various base stations one by one. Therefore, when the terminal transmits uplink data to the base station, the data on the PDCP layer require to be split and the split data are transmitted to the base stations, and the data on the RLC layers are correspondingly transmitted to corresponding base stations. However, currently, there is no disclosed technical solution about how to report information about buffer data in the BSR based on split bearers. That is, at this time, the base station cannot accurately know the data required to be transmitted by the terminal, and thereby the resources are wasted or are insufficient in the process of the terminal transmitting uplink data.

SUMMARY

In order to solve the above problem, the embodiments of the present document propose a method and apparatus for reporting and receiving a buffer status, which can realize the reporting of a buffer status when there is a split bearer.

In order to achieve the above purpose, the embodiment of the present document proposes a method for reporting a buffer status, including:

when a terminal judges that there is a split bearer in a radio bearer or receives a notification transmitted by a base station that an additional buffer report is required to be reported, the terminal transmitting a Buffer Status Report (BSR) of the radio bearer to the base station; herein the BSR carries size information about buffer data and size information about additional buffer data of the radio bearer.

In one embodiment, the method further includes:

the terminal receiving uplink authorization information transmitted by the base station, herein the uplink authorization information is determined by the base station according to the BSR and a transmission rule.

In the method according to the embodiment of the present document, when there are both a split bearer and a non-split bearer in the radio bearers, the size information about additional buffer data is size information about total buffer data of Packet Data Convergence Protocol (PDCP) layer corresponding to various split bearers in the radio bearers; and when all of the radio bearers are split bearers, the size information about additional buffer data is size information about total buffer data of the PDCP layer or Radio Link Control (RLC) layers.

In one embodiment, the size information about buffer data is an index value corresponding to the size of the buffer data, and the size information about total buffer data is an index value corresponding to the size of the total buffer data.

The embodiment of the present document further proposes a method for receiving a buffer status, including:

a base station receiving a Buffer Status Report (BSR) of a radio bearer transmitted by a terminal, herein the BSR carries size information about buffer data and size information about additional buffer data of the radio bearers.

In one embodiment, the method further includes:

the base station determining uplink authorization information according to information about both the BSR and a transmission rule, and transmitting the uplink authorization information to the terminal.

In one embodiment, the size information about additional buffer data is size information about buffer data of Packet Data Convergence Protocol (PDCP) layer or size information about buffer data of Radio Link Control (RLC) layers corresponding to various split bearers in the radio bearers.

In one embodiment, the transmission rule is determined by a pre-negotiation between the base station and other base stations except the base station, or is determined by a negotiation between the base station and other base stations after the base station receives the BSR.

In one embodiment, the transmission rule is an allocation ratio of buffer data of the PDCP layer transmitted by different base stations.

The embodiment of the present document further proposes an apparatus for reporting a buffer status, at least including a transmitting module, herein the transmitting module is configured to, when judging that there is a split bearer in a radio bearer or receiving a notification transmitted by a base station that an additional buffer report is required to be reported, transmit a Buffer Status Report (BSR) of the radio bearer to the base station; herein the BSR carries size information about buffer data and size information about additional buffer data of the data radio bearer.

In one embodiment, the apparatus include a receiving module, herein the receiving module is configured to receive uplink authorization information transmitted by the base station; herein the uplink authorization information is determined by the base station according to the BSR and a transmission rule.

In one embodiment, when there are both a split bearer and a non-split bearer in the radio bearers, the size information about additional buffer data is size information about total buffer data of Packet Data Convergence Protocol (PDCP) layer corresponding to various split bearers in the radio bearers; and when all of the radio bearers are split bearers, the size information about additional buffer data is size information about total buffer data of the PDCP layer or Radio Link Control (RLC) layers.

In one embodiment, the size information about buffer data is an index value corresponding to the size of the buffer data, and the size information about the total buffer data is an index value corresponding to the size of the total buffer data.

The embodiment of the present document further proposes an apparatus for receiving a buffer status, at least including a receiving module, herein the receiving module is configured to receive a Buffer Status Report (BSR) of a data radio bearer transmitted by a terminal, herein the BSR carries size information about buffer data of the data radio bearer, or the BSR carries size information about buffer data and size information about additional buffer data of the radio bearers.

In one embodiment, the apparatus further includes a transmitting module, herein the transmitting module is configured to determine uplink authorization information according to the BSR and a transmission rule, and transmit the uplink authorization information to the terminal.

In one embodiment, the size information about additional buffer data is size information about buffer data of Packet Data Convergence Protocol (PDCP) layer or size information about buffer data of Radio Link Control (RLC) layers corresponding to various split bearers in the radio bearers.

In one embodiment, the transmission rule is determined by a pre-negotiation between the base station and other base stations except the base station, or is determined by a negotiation between the base station and other base stations after the base station receives the BSR.

In one embodiment, the transmission rule is an allocation ratio of buffer data of the PDCP layer transmitted by different base stations.

Compared with the related technology, the embodiments of the present document include: when a terminal judges that there is a split bearer in a radio bearer or receives a notification transmitted by a base station that an additional buffer report is required to be reported, the terminal transmits a BSR of the radio bearers to the base station; herein the BSR carries size information about buffer data and size information about additional buffer data of the radio bearer. With the solutions according to the embodiments of the present document, the terminal transmits corresponding BSRs to various base stations, and carries size information about additional buffer data in the BSR when the terminal judges that there is a split bearer in radio bearer or receives a notification transmitted by a base station that an additional buffer report is required to be reported. In this way, the reporting of a buffer status is realized when there is a split bearer, so that each base station can acquire a relatively accurate size of buffer data, the terminal can easily perform the processing, and timeliness of the terminal responding to data transmission is enhanced.

BRIEF DESCRIPTION OF THE DRAWINGS

The accompanying drawings in the embodiments of the present document are described below. The accompanying drawings in the embodiments are used to provide a further understanding of the present document and explain the present document together with the description, and do not constitute limitation of the protection scope of the embodiments of the present document.

FIG. 1 is a flowchart of a method for reporting a buffer status according to an embodiment of the present document;

FIG. 2 is a flowchart of a method for receiving a buffer status according to an embodiment of the present document;

PREFERRED EMBODIMENTS

Figure 3:
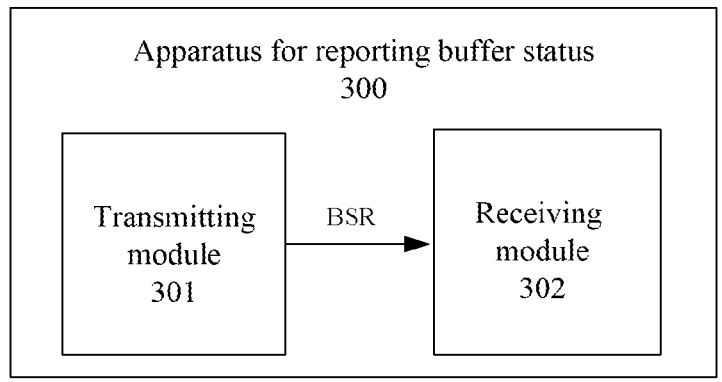
FIG. 3 is a diagram of a structural constitution of an apparatus for reporting a buffer status according to an embodiment of the present document.

The embodiments of the present document will be further described below in conjunction with accompanying drawings, which cannot be used to limit the protection scope of the embodiments of the present document.

With reference to FIG. 1, the embodiments of the present document propose a method for reporting a buffer status, which is suitable for a scenario of a protocol architecture using a manner of split bearer. The method includes:

In step 100, when a terminal judges that there is a split bearer in a radio bearer or receives a notification transmitted by a base station that an additional buffer report is required to be reported, the terminal transmits a BSR of the radio bearer to the base station, herein the BSR carries size information about buffer data and size information about additional buffer data of the radio bearer.

In step 101, the terminal receives uplink authorization information transmitted by the base station, and the terminal transmits uplink data according to the uplink authorization information.

The steps 100 and 101 will be described in detail below respectively.

With respect to step 100, when a terminal judges that there is a split bearer in a radio bearer or receives a notification transmitted by a base station that an additional buffer report is required to be reported, the terminal transmits a BSR of the radio bearer to the base station; herein the BSR carries size information about buffer data and size information about additional buffer data of the radio bearer.

In this step, when the terminal judges that there are both a split bearer and a non-split bearer in the radio bearers at the base station, the size information about additional buffer data includes size information about total buffer data of PDCP layer corresponding to various split bearers in the radio bearers, i.e., the size information about buffer data which is a sum of sizes of buffer data of the PDCP layer corresponding to various split bearers.

When the terminal judges that all of the radio bearers on the base station are split bearers, the size information about additional buffer data is size information about total buffer data of the PDCP layer or RLC layers, i.e., the size information about buffer data which is a sum of sizes of buffer data of various split bearers of the PDCP layer or RLC layers.

When the terminal judges that there is no split bearer in the radio bearers at the base station and does not receive the notification transmitted by a base station that an additional buffer report is required to be reported, the BSR only carries the size information about buffer data of the radio bearers.

Herein, the size information about the total buffer data is an index value corresponding to the size of the total buffer data.

In this step, the size information about the buffer data is an index value corresponding to the size of the buffer data.

Herein, the size of the buffer data is a sum of sizes of buffer data of the PDCP layer and the RLC layers.

If there are multiple radio bearers, a size of the buffer data of the radio bearers carried by the BSR is a sum of the sizes of the buffer data of various radio bearers.

In this step, the radio bearers may be data radio bearers or signaling radio bearers.

In this step, the terminal may judge whether there is a split bearer in the radio bearers according to configuration information about bearers. The configuration information about bearers is transmitted to the terminal by the base station in the process of establishing the radio bearers, and how the terminal judges whether there is a split bearer in the radio bearers according to the configuration information about bearers belongs to the related technology. Alternatively, the base station may also transmit a notification transmitted to the terminal that an additional buffer report is required to be reported, and the terminal no longer requires to judge whether there is a split bearer in the radio bearers according to the configuration information about bearers.

In this step, the size information about buffer data of the PDCP layer or RLC layers may be stored by adding a new field in the BSR. Formats of the BSR are shown in table 1 and table 2, herein the format in table 1 is a format of a short BSR or a truncated BSR, and the format in table 2 is a format of a long BSR.

TABLE 1

| LCG identity | Size information about buffer data | LCG identity | Size information about additional buffer data |
| --- | --- | --- | --- |

TABLE 2

| Size information about buffer data of a radio bearer corresponding to LCG0 | Size information about buffer data of a radio bearer corresponding to LCG1 | Size information about buffer data of a radio bearer corresponding to LCG2 | Size information about buffer data of a radio bearer corresponding to LCG3 |
| --- | --- | --- | --- |
| Size information about additional buffer data corresponding to LCG0 | Size information about additional buffer data corresponding to LCG1 | Size information about additional buffer data corresponding to LCG2 | Size information about additional buffer data corresponding to LCG3 |

Table 1 may be represented by using two bytes, herein one byte represents an LCG identity and size information about buffer data, and the other byte represents an LCG identity and size information about additional buffer data. The LCG identity is 2 bits, and both the size information about buffer data and the size information about additional buffer data are 6 bits.

In table 2, if there is no data radio bearer corresponding to the LCG, the value is 0.

Table 2 may be represented by using 6 bytes, herein former 3 bytes represent size information about buffer data corresponding to 4 LCGs, and latter 3 bytes represent size information about additional buffer data corresponding to 4 LCGs. Both the size information about buffer data and the size information about additional buffer data are 6 bits. In the step, if there are multiple split bearers in a base station, various split bearers may be caused to belong to different LCGs.

With respect to step 101, the terminal receives uplink authorization information transmitted by the base station, and the terminal transmits uplink data according to the uplink authorization information.

In this step, the uplink authorization information is determined by the base station according to information about both the BSR and a transmission rule.

The embodiment of the present document further proposes a method for receiving a buffer status. With reference to FIG. 2, the method includes:

In step 200, a base station receives a BSR of radio bearers transmitted by a terminal, herein the BSR carries size information about buffer data and size information about additional buffer data of the radio bearers.

In this step, the size information about additional buffer data is size information about buffer data of PDCP layer or size information about buffer data of RLC layers corresponding to various split bearers in the radio bearers.

The method for receiving a buffer status proposed in the embodiment of the present document further includes.

In step 201, the base station determines uplink authorization information according to the BSR and a transmission rule, and transmits the uplink authorization information to the terminal.

In this step, the transmission rule is determined by a pre-negotiation between the base station and other base stations, or is determined by a pre-negotiation between the base station and other base stations after the base station receives the BSR.

Herein, the negotiation of the transmission rule among base stations may be realized by using the related technology, which is not used to limit the protection scope of the embodiments of the present document.

In this step, the base station may determine the uplink authorization information according to the relate technology, which is not used to limit the protection scope of the embodiments of the present document.

In this step, the transmission rule may be but is not limited to a data allocation ratio of buffer data of various split bearers of the PDCP layer which are transmitted through different base stations.

In the following embodiments, base station 1 is a macro base station, and has a cell which is cell 1, and base station 2 is a base station of a small cell, and has two cells which are cell 3 and cell 4. The following embodiments are described for data radio bearers, and the steps of reporting the BSR for signaling radio bearers are the same as the steps of reporting the BSR for data radio bearers, and will not be repeated in the following embodiments.

Embodiment One

A terminal establishes a connection with the cell 1. As the traffic volume increases, the base station 1 adds cell 3 for the terminal according to a measurement report, and configures two data radio bearers, which are data radio bearer 1 and data radio bearer 2 respectively, and belong to LCG0. Herein, the data radio bearer 2 is a radio bearer which may be split for transmission, i.e., the data radio bearer 2 may be transmitted through the base station 1 and the base station 2 respectively.

A behavior of the terminal is as follows.

In step 1, when the terminal requires to transmit uplink data, the terminal computes sizes of buffer data of all current LCGs (currently there is only LCG0) of each base station.

As there is only the LCG0, a short BSR is used for reporting. There are two radio data bearers on the LCG0, and therefore they may be computed all together.

In step 2, the terminal judges that there is a split bearer according to configuration information, and therefore the terminal requires to report size information about additional buffer data.

The size information about buffer data reported by the terminal to the base station 1 is computed as follows.

There are two data radio bearers on the RLC layer, and a size of buffer data is 200+300=500, and a size of buffer data of two data radio bearers on the PDCP layer is 600. Therefore, a size of buffer data carried in the BSR is 500+600=1100. In addition, size information about the additional buffer data is a size of buffer data of the PDCP layer of the radio bearer 2 which is a split bearer at this time, i.e., 400. Therefore, the terminal reports a BSR which carries an index value corresponding to the size of the buffer data of the LCG0, i.e., 1100, to the base station 1. Further, the BSR carries an index value corresponding to the size of the buffer data, i.e., 400.

The size information about buffer data reported to the base station 2 by the terminal is computed as follows.

There is only one data radio bearer 2 on the RLC layer, and therefore a size of buffer data is 400, and a size of buffer data of the data radio bearer 2 on the PDCP layer is 400. Therefore, a size of buffer data carried in the BSR is 400+400=800. In addition, size information about the additional buffer data is a size of buffer data of the PDCP layer of the radio bearer 2 which is a split bearer at this time, i.e., 400. Therefore, the terminal reports a BSR, which carries an index value corresponding to the size of the buffer data of the LCG0, i.e., 800, to the base station 2. Further, the BSR carries an index value corresponding to the size of the buffer data, i.e., 400.

A behavior of the base station is as follows.

In step 10, a negotiation of a transmission rule of the data radio bearer 2 in the cell 1 and the cell 3 is performed between the base station 1 and the base station 2.

A negotiation result is that for the split bearer of the data of the PDCP layer, 30% of the data is transmitted at the cell 1, and 70% of the data is transmitted at the cell 3.

In step 11, the base station 1 receives the BSR reported by the terminal, determines uplink authorization information according to a size of the buffer data and the negotiated transmission rule, and transmits the uplink authorization information to the terminal.

The terminal receives the uplink authorization information, and transmits uplink data. At this time, the size of the data of the PDCP layer is 400, and according to the transmission rule, the base station 1 requires to transmit 120.

In step 12, the base station 2 receives the BSR reported by the terminal, determines uplink authorization information according to a size of the buffer data and the negotiated transmission rule, and transmits the uplink authorization information to the terminal.

The terminal receives the uplink authorization information, and transmits uplink data. At this time, the size of the data of the PDCP layer is 400, and according to the transmission rule, the base station 1 requires to transmit 280.

In step 13, the base station 1 or the base station 2 may decide to initiate a re-negotiation flow for the transmission rule according to the received BSR. After the negotiation is completed, the base station 1 and the base station 2 perform scheduling of the data to be transmitted according to a new transmission rule.

Embodiment Two

A terminal establishes a connection with the cell 1. As the traffic volume increases, the base station 1 adds cell 3 for the terminal according to a measurement report, and configures two data radio bearers, which are data radio bearer 1 and data radio bearer 2 respectively. The data radio bearer 1 belongs to LCG0, and the data radio bearer 2 belongs to LCG1. Herein, the data radio bearer 2 is a radio bearer which may be split for transmission, i.e., the data radio bearer 2 may be transmitted through the base station 1 and the base station 2 respectively.

A behavior of the terminal is as follows.

In step 20, when the terminal requires to transmit uplink data, the terminal computes sizes of buffer data of all current LCGs (there are currently LCG0 and LCG1) of each base station.

The base station 1 has two LCGs, and therefore a long BSR is used for reporting. The base station 2 has one LCG, and therefore a short BSR is used for reporting.

In step 21, the terminal judges that there is a split bearer according to configuration information, and therefore requires to report information about additional BS.

The size information about buffer data reported by the terminal to the base station 1 is computed as follows.

A size of buffer data of the data radio bearer 1 on the RLC layer is 200, and a size of buffer data of the data radio bearer 1 on the PDCP layer is 200. Therefore, a size of buffer data carried in the BSR is 200+200=400. In addition, size information about the additional buffer data is a size of buffer data of the RLC layer, i.e., 200.

A size of buffer data of the data radio bearer 2 on the RLC layer is 300, and a size of buffer data of the data radio bearer 2 on the PDCP layer is 400. Therefore, a size of buffer data carried in the BSR is 300+400=700. In addition, size information about the additional buffer data is a size of buffer data of the RLC layer, i.e., 300.

Therefore, the terminal reports a BSR which carries an index value corresponding to the size of the buffer data of the LCG0, i.e., 400, and carries an index value corresponding to the size of the buffer data of the LCG1, i.e., 700, to the base station 1. The LCG2 and the LCG3 do not have data radio bearers, and therefore the size of the buffer data is 0. Further, the BSR carries an index value corresponding to the size of the buffer data of the LCG0, i.e., 200, and an index value corresponding to the size of the buffer data of the LCG1, i.e., 300. The LCG2 and the LCG3 do not have data radio bearers, and therefore the size of the buffer data is 0.

At this time, it may be further detailed as follows. When the terminal computers the size information about buffer data of the LCG, if the LCG does not have a split bearer, there is no requirement to report size information about additional buffer data. If there is a split bearer, there is a requirement to report the size information about additional buffer data. Then, for the LCG0, there is no requirement to report the size information about additional buffer data, and for the LCG1, there is a requirement to report the size information about additional buffer data. Alternatively, for all LCGs, there is a requirement to report the size information about additional buffer data, no matter whether there is a split bearer in the radio bearers which belong to the LCG. If there is no split bearer, the size information about additional buffer data is 0.

The size information about buffer data reported to the base station 2 by the terminal is computed as follows.

A size of buffer data of the data radio bearer 2 on the RLC layer is 400, and a size of buffer data of the data radio bearer 2 on the PDCP layer is 400. Therefore, a size of buffer data carried in the BSR is 400+400=800. In addition, size information about the additional buffer data is the size of buffer data of the RLC layer, i.e., 400.

Therefore, the terminal reports a BSR which carries an index value corresponding to the size of the buffer data of the LCG1, i.e., 800 to the base station 2. Further, the BSR carries an index value corresponding to the size of the buffer data of the LCG1, i.e., 400.

As described above, if the base station further configures data radio bearers on the LCG2 and LCG3 for the terminal, the terminal computes and reports according to the LCG0 and/or LCG1 respectively.

A behavior of the base station is as follows.

In step 30, a negotiation of a transmission rule of the data radio bearer 2 in the cell 1 and the cell 3 is performed between the base station 1 and the base station 2.

A negotiation result is that for the split bearer of the data of the PDCP layer, 20% of the data is transmitted at the cell 1, and 80% of the data is transmitted at the cell 3.

In step 31, the base station 1 receives the BSR reported by the terminal, determines uplink authorization information according to a size of the buffer data and the negotiated transmission rule, and transmits the uplink authorization information to the terminal.

The terminal receives the uplink authorization information and transmits uplink data. At this time, the size of the data of the PDCP layer is 400, and according to the transmission rule, the base station 1 requires to transmit 80.

In step 32, the base station 2 receives the BSR reported by the terminal, determines uplink authorization information according to a size of the buffer data and the negotiated transmission rule, and transmits the uplink authorization information to the terminal.

The terminal receives the uplink authorization information and transmits uplink data. At this time, the size of the data of the PDCP layer is 400, and according to the transmission rule, the base station 1 requires to transmit 320.

Embodiment Three

A terminal establishes a connection with the cell 1. As the traffic volume increases, the base station 1 adds cell 3 for the terminal according to a measurement report, and configures two data radio bearers, which are data radio bearer 1 and data radio bearer 2 respectively, and belong to LCG0. Herein, the data radio bearer 2 is a radio bearer which may be split for transmission, i.e., the data radio bearer 2 may be transmitted through the base station 1 and the base station 2 respectively.

A behavior of the terminal is as follows.

In step 40, when the terminal requires to transmit uplink data, the terminal computes sizes of buffer data of all current LCGs (currently there is only LCG0) of each base station.

As there is only the LCG0, a short BSR is used for reporting. There are two radio data bearers on the LCG0, and therefore they may be computed all together.

In step 41, the terminal receives the notification of the base station 1 to know that size information about additional buffer data, i.e., size information about buffer data of the PDCP layer of the split bearer, is required to be reported.

The size information about buffer data reported by the terminal to the base station 1 is computed as follows.

There are two data radio bearers on the RLC layer, and a size of buffer data is 200+300=500, and a size of buffer data of two data radio bearers on the PDCP layer is 600. Therefore, a size of buffer data carried in the BSR is 500+600=1100. In addition, size information about the additional buffer data is a size of buffer data of the PDCP of the radio bearer 2 which is a split bearer at this time, i.e., 400. Therefore, the terminal reports a BSR, which carries an index value corresponding to the size of the buffer data of the LCG0, i.e., 1100, to the base station 1. Further, the BSR carries an index value corresponding to the size of the buffer data, i.e., 400.

In step 42, the terminal knows that there is a split bearer according to the configuration, and therefore size information about additional buffer data is required to be reported.

The BS reported by the terminal to the base station 2 is computed as follows.

There is only one data radio bearer 2 on the RLC layer, and therefore a size of buffer data is 400, and a size of buffer data of the data radio bearer 2 on the PDCP layer is 400. Therefore, a size of buffer data carried in the BSR is 400+400=800. In addition, size information about the additional buffer data is a size of buffer data of the PDCP layer of the radio bearer 2 which is a split bearer at this time i.e., 400. Therefore, the terminal reports a BSR which carries an index value corresponding to the size of the buffer data of the LCG0, i.e., 800, to the base station 2. Further, the BSR carries an index value corresponding to the size of the buffer data, i.e., 400.

A behavior of the base station is as follows.

In step 50, a negotiation of a transmission rule of the data radio bearer 2 in the cell 1 and the cell 3 is performed between the base station 1 and the base station 2.

A negotiation result is that for the split bearer of the data of the PDCP layer, 30% of the data is transmitted at the cell 1, and 70% of the data is transmitted at the cell 3. Further, the base station 1 notifies the terminal that the size information about additional buffer data is required to be reported.

In step 51, the base station 1 receives the BSR reported by the terminal, determines uplink authorization information according to a size of the buffer data and the negotiated transmission rule, and transmits the uplink authorization information to the terminal.

The terminal receives the uplink authorization information and transmits uplink data. At this time, the size of the data of the PDCP layer is 400, and according to the transmission rule, the base station 1 requires to transmit 120.

In step 52, the base station 2 receives the BSR reported by the terminal, determines uplink authorization information according to a size of the buffer data and the negotiated transmission rule, and transmits the uplink authorization information to the terminal.

The terminal receives the uplink authorization information and transmits uplink data. At this time, the size of the data of the PDCP layer is 400, and according to the transmission rule, the base station 2 requires to transmit 280.

In step 53, the base station 1 or the base station 2 may decide to initiate a re-negotiation flow for the transmission rule according to the received BSR. After the negotiation is completed, the base station 1 and the base station 2 perform scheduling of the data to be transmitted according to a new transmission rule.

In the above embodiments, if the terminal is configured with cell 1, cell 3 and cell 4, both the cell 3 and the cell 4 belong to the base station 2, but the process and the computation method of the terminal reporting the BSR to the base station 2 are not influenced. Further, the processes of reporting a short BSR, a long BSR and a truncated BSR are the same.

The transmission rule, for example, a data allocation ratio of buffer data of various split bearers of the PDCP layer which are transmitted by different base stations is determined by a pre-negotiation between the base station and other base stations, or is determined by a pre-negotiation with other base stations after the base station receives the BSR. The negotiation process may refer to the following steps.

In step 60, the base station 1 transmits a request for the data allocation ratio of buffer data of various split bearers of the PDCP layer which are transmitted by different base stations (at this time, a ratio between the base station 1 and the base station 2 is 3:7) to the base station 2.

In step 61, after receiving the request, if the base station 2 considers that the ratio is suitable, the base station 2 will responds with a response message to confirm the ratio and the process ends.

If the base station 2 considers that the ratio is not suitable, the base station 2 will responds with a response message and transmit a response of a recommended ratio, for example, a ratio between the base station 1 and the base station 2 is 2:8, to the base station 2.

In step 62, after receiving the response message of the base station 2, if the base station 1 considers that the ratio is suitable, the base station 1 will respond with a response message to confirm the ratio, and the process ends.

The embodiment of the present document further proposes an apparatus (300) for reporting a buffer status, as shown in FIG. 3, at least including a transmitting module (301) and a receiving module (302), herein the transmitting module (301) is configured to, after judging that there is a split bearer in a radio bearer or receiving a notification transmitted by a base station that an additional buffer report is required to be reported, transmit a Buffer Status Report (BSR) of the radio bearer to the base station; herein the BSR carries size information about buffer data and size information about additional buffer data of the data radio bearer.

The apparatus according to the embodiments of the present document further includes:

the receiving module (302), which is configured to receive uplink authorization information transmitted by various base stations, herein the uplink authorization information is determined by the base station according to the BSR and a transmission rule.

In the apparatus according to the embodiments of the present document, when there is both a split bearer and a non-split bearer in the radio bearers, the size information about additional buffer data is size information about total buffer data of Packet Data Convergence Protocol (PDCP) layer corresponding to various split bearers in the radio bearers; and when all of the radio bearers are split bearers, the size information about additional buffer data is size information about total buffer data of the PDCP layer or Radio Link Control (RLC) layers.

In the apparatus according to the embodiments of the present document, the size information about buffer data is an index value corresponding to the size of the buffer data, and the size information about the total buffer data is an index value corresponding to the size of the total buffer data.

Figure 4:
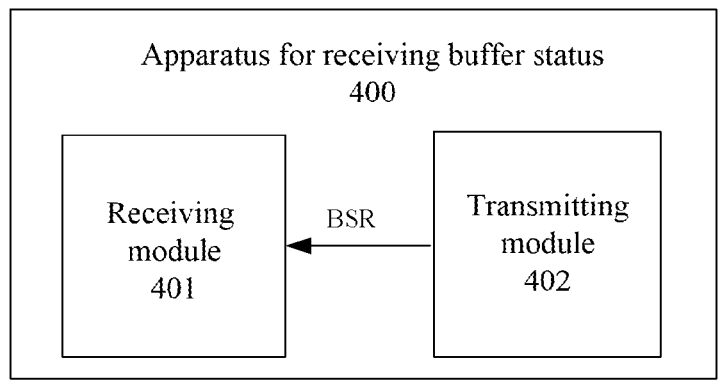
FIG. 4 is a diagram of a structural constitution of an apparatus for receiving a buffer status according to an embodiment of the present document.

The embodiment of the present document further proposes an apparatus (400) for receiving a buffer status, as shown in FIG. 4, at least including a receiving module (401) and a transmitting module (402), herein the receiving module (401) is configured to receive a BSR of data radio bearers transmitted by a terminal, herein the BSR carries size information about buffer data and size information about additional buffer data of the radio bearers.

The transmitting module (402) is configured to determine uplink authorization information according to the BSR and a transmission rule, and transmit the uplink authorization information to the terminal.

In the apparatus according to the embodiments of the present document, the size information about additional buffer data is size information about buffer data of PDCP layer or size information about buffer data of RLC layers corresponding to various split bearers in the radio bearers.

In the apparatus according to the embodiments of the present document, the transmission rule is determined by a pre-negotiation between the base station and other base stations, or is determined by a negotiation between the base station and other base stations after the base station receives the BSR.

In the apparatus according to the present document, the transmission rule is an allocation ratio of buffer data of the PDCP layer transmitted by different base stations.

The above embodiments are only used to facilitate understanding for those skilled in the art and are not intended to limit the protection scope of the embodiments of the present document. Any obvious substitution and improvement etc. made by those skilled in the art on the embodiments of the present document without departing from the inventive concept of the embodiments of the present document should be included within the protection scope of the embodiments of the present document.

INDUSTRIAL APPLICABILITY

Compared with the related technology, the embodiments of the present document include: when a terminal judges that there is a split bearer in a radio bearer or receives a notification transmitted by a base station that an additional buffer report is required to be reported, the terminal transmits a BSR of the radio bearer to the base station; herein the BSR carries size information about buffer data and size information about additional buffer data of the radio bearer. With the solutions according to the embodiments of the present document, the terminal transmits corresponding BSRs to various base stations, and carries size information about additional buffer data in the BSR when the terminal judges that there is a split bearer in radio bearer or receives a notification transmitted by a base station that an additional buffer report is required to be reported. In this way, the reporting of a buffer status is realized when there is a split bearer, so that each base station can acquire a relatively accurate size of buffer data, the terminal can easily perform the processing, and timeliness of the terminal responding to data transmission is enhanced.

What is claimed is:

1. A method for reporting a buffer status, comprising:
    when a terminal judges that there is a split bearer in a radio bearer or receives a notification transmitted by a base station that an additional buffer report is required to be reported, the terminal transmitting a Buffer Status Report (BSR) of the radio bearer to the base station;
    wherein the BSR carries size information about buffer data of the radio bearer and size information about additional buffer data of the radio bearer;
    wherein when there are both a split beater and a non-split bearer in the radio bearers, size of the additional buffer data is size of total buffer data of Packet Data Convergence Protocol (PDCP) layer corresponding to various split bearers in the radio bearers; and when all of the radio bearers are split bearers, size of the additional buffer data is size of total buffer data of the PDCP layer or Radio Link Control (RLC) layers.

2. The method for reporting a buffer status according to claim 1, further comprising:
    the terminal receiving uplink authorization information transmitted by the base station, wherein the uplink authorization information is determined by the base station according to the BSR and a transmission rule.

3. The method for reporting a buffer status according to claim 1, wherein the size information about the buffer data is an index value corresponding to the size of the buffer data.

4. A method for receiving a buffer status, comprising:
    a base station receiving a Buffer Status Report (BSR) of a radio bearer transmitted by a terminal, wherein the BSR carries size information about buffer data of the radio bearer and size information about additional buffer data of the radio bearers;
    wherein when there are both a split beater and a non-split bearer in the radio bearers, size of the additional buffer data is size of total buffer data of Packet Data Convergence Protocol (PDCP) layer corresponding to various split bearers in the radio bearers; and when all of the radio bearers are split bearers, size of the additional buffer data is size of total buffer data of the PDCP layer or Radio Link Control (RLC) layers.

5. The method for receiving a buffer status according to claim 4, further comprising:
    the base station determining uplink authorization information according to information about both the BSR and a transmission rule, and transmitting the uplink authorization information to the terminal.

6. The method for receiving a buffer status according to claim 5, wherein the transmission rule is determined by a pre-negotiation between the base station and other base stations except the base station, or is determined by a negotiation between the base station and other base stations after the base station receives the BSR.

7. The method for receiving a buffer status according to claim 5, wherein the transmission rule is an allocation ratio of buffer data of the PDCP layer received by different base stations.

8. An apparatus for reporting a buffer status, comprising a transmitting module, wherein
    the transmitting module is configured to, when judging that there is a split bearer in a radio bearer or receiving a notification transmitted by a base station that an additional buffer report is required to be reported, transmit a Buffer Status Report (BSR) of the radio bearer to the base station; wherein the BSR carries size information about buffer data of the radio bearer and size information about additional buffer data of the data radio bearer;
    wherein when there are both a split bearer and a non-split bearer in the radio bearers, size of the additional buffer data is size of total buffer data of Packet Data Convergence Protocol (PDCP) layer corresponding to various split bearers in the radio bearers; and when all of the radio bearers are split bearers, size of the additional buffer data is size of total buffer data of the PDCP layer or Radio Link Control (RLC) layers.

9. The apparatus for reporting a buffer status according to claim 8, further comprising a receiving module, wherein
    the receiving module is configured to receive uplink authorization information transmitted by the base station; wherein the uplink authorization information is determined by the base station according to the BSR and a transmission rule.

10. The apparatus for reporting a buffer status according to claim 8, wherein the size information about the buffer data is an index value corresponding to the size of the buffer data.

11. An apparatus for receiving a buffer status, comprising a receiving module, wherein
    the receiving module is configured to receive a Buffer Status Report (BSR) of a data radio bearer transmitted by a terminal, wherein the BSR carries size information about buffer data of the data radio bearer, or the BSR carries size information about buffer data of the radio bearer and size information about additional buffer data of the radio bearer;
    wherein when there are both a split bearer and a non-split bearer in the radio bearers, size of the additional buffer data is size of total buffer data of Packet Data Convergence Protocol (PDCP) layer corresponding to various split bearers in the radio bearers; and when all of the radio bearers are split bearers, size of the additional buffer data is size of total buffer data of the PDCP layer or Radio Link Control (RLC) layers.

12. The apparatus for receiving a buffer status according to claim 11, further comprising a transmitting module, wherein
    the transmitting module is configured to determine uplink authorization information according to the BSR and a transmission rule, and transmit the uplink authorization information to the terminal.

13. The apparatus for receiving a buffer status according to claim 11, wherein the transmission rule is determined by a pre-negotiation between the base station and other base stations except the base station, or is determined by a negotiation between the base station and other base stations after the base station receives the BSR.

14. The apparatus for receiving a buffer status according to claim 11, wherein the transmission rule is an allocation ratio of buffer data of the PDCP layer received by different base stations.

\* \* \* \* \*